Patented Sept. 2, 1930

1,774,546

UNITED STATES PATENT OFFICE

HERMANN CLAASSEN, OF DORMAGEN, GERMANY

MANUFACTURE OF BAKING YEAST

No Drawing. Application filed October 6, 1927, Serial No. 224,524, and in Germany November 19, 1926.

It is known that a yeast manufactured from molasses alone, or with addition of a further organic nitrogen nutriment, by the aeration process, is a much better and more durable baking yeast than a yeast which is prepared with inorganic or mixed nitrogen nutriment. By mixed nitrogen nutriment is understood a mixture of inorganic and organic nitrogen nutriment. The yeast prepared from molasses alone, or generally from organic nitrogen nutriment, has, however, mostly the disadvantage that its albumen proportion is low, and also that its fermenting power does not always fulfil the requirements of bakers. On the contrary, yeast prepared with inorganic nitrogen nutriment has the disadvantage that while it is very rich in albumen, it is not durable and its fermenting power which is very good at first decreases in a very short time.

According to the present invention, by a modification in the preparation of setting yeast, its properties are influenced in such a manner that even in a nutrient solution with a purely organic nitrogen nutriment it grows with a good yield to a very well fermenting yeast, rich in albumen and nevertheless durable. The process is as follows:

First of all, in a nutrient solution which is prepared from malt and malt sprouts, and contains only nitrogen containing nutriment which is obtained from organic substances, a mother yeast free from mold yeast is grown. This mother yeast is then further cultivated in molasses to which inorganic nitrogen is added in increasing quantities. The mixtures of organic and inorganic nitrogen nutriment are chosen so that the first culture or generation has a proportion of about 50–55% albumen in the dry substance, while the subsequent cultures contain over 55%. The nutrient solution referred to is prepared from malt and malt sprouts by treating approximately 75 kg. of malt, depending upon its characteristics, alone or by the addition of from 10%–50% of malt germs with as much water as is necessary so that a solution of approximately 16°–18° Bg. is produced which contains only nitrogen nutriment which is obtained from organic substances. In this solution a mother yeast is grown.

When in the second or third generation, a yeast of this albumen percentage is prepared, it is not compressed as is otherwise usual, but separated from the residual wort by known centrifugal separators, and then used at once as setting yeast for the manufacture of baking yeast from molasses. It is essential that the said setting yeast is not compressed and stored for a long time in a compressed state, but that it is used as setting yeast immediately after the separation from the residual wort, as owing to its overfeeding with inorganic nitrogen, it is not durable and therefore quickly loses its valuable property as setting yeast.

This valuable property is that it is highly adapted, when increasing and growing, to absorb the organic nitrogen from the molasses solution and any subsequently added organic nitrogen compounds, and thereby to change its composition, so that though the albumen proportion in the growing yeast decreases it nevertheless still remains always greater than 45% in the dry substance, and that the nature of the albumen is modified by the nourishing with the organic nitrogen, owing to which its durability and fermenting power are increased.

The following is an example for carrying the process into practical effect:

2.5 kg. yeast of the desired and suitable kinds are fermented for 12 hours with 75 kg. kiln dried malt in 150 liters of water. The mother yeast thus obtained is introduced into a wort prepared from 125 kg. molasses and a concentrated malt sprout extract from 35 kg. malt sprouts and a small quantity of ammonium sulphate (about 4 kg.) with a content of 14° Bg. whereupon another fermentation is carried out without aeration. The transfer of this mash into a new but more diluted wort of about 6° Bg. and of the same composition is repeated, and fermentation effected with a slight aeration. This fermented mash is used for the preparation of the first generation, the whole of its quantity, that is to say, the yeast produced, with the fermented wort, being transferred into an original wort of 5–6° Bg. which is prepared from 1200 kg. molasses, 120 kg. malt sprouts with the addition of so much ammonium sulphate that the yeast manufactured therefrom with aeration has a proportion of 50–55% albumen in the dry substance for which purpose about 30 kg. ammonium sulphate are generally required. 550 kg. of yeast of first generation are obtained.

For the preparation of the second culture (generation), 55 kg. of yeast of the first generation are fermented in a nutrient solution prepared from 500 kg. molasses and 45–50 kg. ammonium sulphate without malt sprouts with a proportion of 3.5–4.0° Bg. with 7 hours aeration at medium temperatures and with an acid proportion of 1.0–1.8° or in $p_H$ concentration between 4.5–4.8°. The yeast thus produced contains 60–65% albumen, and is separated by separators from the fermented wort and supplied immediately in a semi-liquid state without pressing to the wort which is used for the production of the export yeast (baking yeast).

This wort is prepared from 3000 kg. molasses and from the extract from 450 kg. malt sprouts. It is diluted to about 4° Bg. and fermented with the yeast of the second culture at the initial temperature of 26° for ten hours with the usual aeration, about 12 liters sulphuric acid being added after 2 hours, of $p_H$ concentration 5.7–6.0°. After the fermentation of 1.4° Bg. and 0.1–0.2° acid, the yeast is separated and pressed. 1540 kg. will be obtained after deduction of the setting yeast, or altogether 1860 kg. of export yeast of 45% albumen. The baking yeast thus produced is extraordinarily durable and its fermenting power lasts longer than that of other yeasts. The dough produced with the new yeast may be prematurely introduced into the baking oven without the rising being affected. On the contrary, it will be greatly assisted thereby, so that the great practical advantage is obtained that the bread is finished in a materially short time.

The molasses before any fermentation is diluted with water, heated to 80° and sterilized with the addition of 4% superphosphate and 1% sulphuric acid, and then filtered off. The superphosphate is the well known material obtained by treating lime phosphate with sulphur acid in which the acid is of a 96% concentration.

I claim as my invention:—

1. In a process for manufacturing bakers' yeast, the steps of preparing two or more cultures one following the other in new molasses solutions from which each following solution contains increasing quantities of inorganic nitrogen nutriment and producing yeast having an increasing albumen proportion, and separating the strongly fattened yeast from the wort of the second or last culture to produce setting yeast for the manufacture of baking yeast.

2. In a process for manufacturing bakers' yeast, the steps of cultivating a mother yeast in a nutrient solution with a purely organic nitrogen nutriment, preparing two or more cultures one following the other in new molasses solutions from which each following solution contains increasing quantities of inorganic nitrogen nutriment and producing yeasts with an increasing albumen proportion, and separating the strongly fattened yeast, containing approximately 55% of albumen in the dry substance, from the wort of the second or last culture to produce setting yeast for the manufacture of baking yeast.

3. In a process for manufacturing bakers' yeast, the steps of cultivating a mother yeast in a nutrient solution with a purely organic nitrogen nutriment, and of preparing two or more cultures one following the other in new molasses solutions from which each following solution contains increasing quantities of inorganic nitrogen nutriment, producing yeast having an increasing albumen proportion, and separating the strongly fattened yeast from the wort.

4. In a process for manufacturing bakers' yeast, the steps of cultivating a mother yeast in a nutrient solution with a purely organic nitrogen nutriment, and of preparing two or more cultures one following the other in new molasses solutions from which each following solution contains increasing quantities of inorganic nitrogen nutriment and producing yeast having an increasing albumen proportion, separating the strongly fattened yeast from the wort, and using this yeast as preparing (setting) yeast for the manufacture of baking yeast in molasses solution alone or with addition of other organic nitrogen nutriment.

In testimony whereof I have affixed my signature.

Dr. HERMANN CLAASSEN.